United States Patent [19]

Van-Det et al.

[11] Patent Number: 5,110,853

[45] Date of Patent: May 5, 1992

[54] FREEZE-THAW STABLE POLYACRYLAMIDE EMULSIONS

[75] Inventors: Nguyen Van-Det, Midland, Ga.; Peter M. Robinson, High Point, N.C.

[73] Assignee: Exxon Chemical Patents Inc., Linden, N.J.

[21] Appl. No.: 573,484

[22] Filed: Aug. 27, 1990

[51] Int. Cl.$^5$ .............. C08F 2/32; C08J 3/00; C08K 5/06

[52] U.S. Cl. ............................ 524/375; 524/801

[58] Field of Search ................... 524/375, 801

[56] References Cited

U.S. PATENT DOCUMENTS

| | | | |
|---|---|---|---|
| 3,624,019 | 11/1971 | Anderson | 260/29.6 |
| 4,021,399 | 5/1977 | Hunter et al. | 260/29.6 |
| 4,022,731 | 5/1977 | Schmitt | 260/29.6 |
| 4,022,736 | 5/1977 | Schmitt | 260/29.6 |
| 4,052,353 | 10/1977 | Scanley | 260/29.6 |
| 4,171,296 | 10/1979 | Connelly et al. | 260/29.6 |
| 4,435,528 | 3/1984 | Domina | 524/801 |
| 4,506,051 | 3/1985 | Rance | 524/233 |
| 4,785,036 | 11/1988 | Robinson et al. | 524/112 |

FOREIGN PATENT DOCUMENTS 2146260  4/1985  United Kingdom .

*Primary Examiner*—Paul R. Michl
*Assistant Examiner*—Patrick Niland

[57] ABSTRACT

Water-in-oil emulsions of water-soluble polymers, i.e. polyacrylamides, which are subject to freeze-thaw degradation are stabilized against repeated freeze-thaw cycles by incorporating specific ethoxylated alkylphenol surfactants containing low levels of ethoxylation. Moreover, the resultant emulsions exhibit superior resistance to sheet gel formation under ambient storage conditions.

23 Claims, No Drawings

FREEZE-THAW STABLE POLYACRYLAMIDE EMULSIONS

This invention relates generally to water-soluble polymers dispersed in water-in-oil emulsions. More particularly, the present invention relates to water-in-oil emulsions of water-soluble polymers which contain low amounts of one or more primary surfactants (emulsion polymerization stabilizers) together with an ethoxylated alkylphenol surfactant. The freeze-thaw stability is provided to the emulsion by the presence of the ethoxylated alkylphenol surfactant. Moreover, the resultant emulsions exhibit superior resistance to sheet gel formation under ambient storage conditions.

Water-in-oil emulsions containing water-soluble polymers dispersed therein are well known in the art. Such emulsions have found a wide variety of uses, for example, as flocculants in the mining and paper industries and in sewage treatment, and as mobility control agents in enhanced oil recovery. Many of these applications occur in low temperature environments, i.e. below 0° C. and even as low as −20° C., where freezing of the emulsions before use is likely to occur. When such frozen emulsions are thawed for use, there is generally a problem of gel formation and/or a loss of product quality. To overcome this problem in the past the art has been forced to add glycols or inorganic salts to depress the freezing point of the emulsions, or to reduce the amount of water-soluble polymer in the system for a given surfactant level (diluting the polymer or increasing the surfactant), or dehydrating the emulsion, or alternatively using special expensive low-titre surfactants. In view of the fact that all of these proposed solutions has resulted in either reducing the product performance or greatly increasing the cost of the resultant emulsions, there is a continuing need for a method of improving the freeze-thaw stability of such emulsions while at the same time minimizing the total amount of surfactant present in the system. It is well known that using large amount of surfactants generally penalizes product performance by the interaction of the surfactants with the water-soluble polymer when the emulsion is inverted for use.

The present invention entails adding small but effective amounts of an ethoxylated alkylphenol surfactant containing more than 1 and up to about 2 moles of ethylene oxide to a conventional water-in-oil emulsion of a water-soluble polymer.

U.K. Application 2,146,260 discloses the use of ethoxylated octyl- or nonylphenols containing 10 to 16 moles of ethylene oxide as inverting surfactants for acrylamide polymers. The emulsions are disclosed as useful in enhanced oil recovery operations and as flocculants in waste water treatment. The emulsions can be inverted with salt water and are claimed to have good freeze-thaw stability.

U.S. Pat. No. 4,785,036 discloses the use of alkenylsuccinic anhydrides to provide freeze-thaw stability to polyacrylamide emulsions.

U.S. Pat. No. 4,506,051 is directed to water-in-oil emulsions having improved low temperature properties. It incorporates an N,N,-dialkylamide in the emulsion so that the stability of the emulsion upon repeated freeze-thaw cycles or the fluidity of the emulsion at low temperatures such as −20 C. is improved. The water-soluble polymers utilized are copolymers of acrylamide and acrylic acid. It does not teach the use of the ethoxylated alkylphenol surfactants as freeze-thaw stabilizing agents.

U.S. Pat. No. 4,022,731 and U.S. Pat. No. 4,022,736 are also directed to freeze-thaw stable, self-inverting, water-in-oil emulsions, wherein the water-soluble polymeric material is a polyacrylamide-based polymer. Neither of these patents suggest the use of an ethoxylated alkylphenol surfactant as a freeze-thaw agent.

None of the prior art suggests that the addition of a small amount of specific ethoxylated alkylphenols having up to about 2 moles of ethylene-oxide will produce water-in-oil emulsions which have freeze-thaw stability and excellent mechanical stability while still containing a low amount of total surfactant.

It is accordingly an object of the present invention to produce water-in-oil emulsions of finely dispersed water-soluble polymeric particles in which the emulsions have improved freeze-thaw stability, preferably at a low level of primary surfactants.

It is a further object to prepare emulsions with mechanical properties equivalent to or better than conventional non-freeze-thaw stabilized emulsions while minimizing the total amount of stabilizers and/or other additives.

These and other objects will become apparent from the ensuing description.

It has been discovered that the addition of certain ethoxylated alkylphenol surfactants having less than about 2 moles of ethylene oxide will provide freeze-thaw stability to water-in-oil emulsions which are not freeze-thaw stable and which contain less than about 40 percent by weight water-soluble polymeric solids. In addition, the present invention permits the use of low levels of primary surfactants, merely enough to stabilize the emulsion during polymerization, generally less than about 3 percent by weight of the total emulsion. The resultant emulsions also possess excellent mechanical stability.

The ethoxylated alkylphenol surfactants useful in the present invention have the general formula:

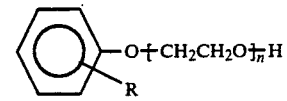

wherein R is a straight chain or branched alkyl group having 8–9 carbon atoms and n is an integer having an average value of more than 1 and up to about 2. Preferably n has a value of about 1.2 to about 1.8.

The ethoxylated alkylphenol surfactant is added to the emulsion after polymerization in an amount effective to provide freeze-thaw stability to the final emulsion. Generally, the amount will be less than about 0.5 percent by weight based on the total weight of the emulsion. More preferably the amount is less than about 0.3 percent. Generally, there is no advantage to adding more than the minimum amount of the surfactant, as determined by routine experimentation.

Although the present invention has been found to be independent of the particular emulsion polymerization method employed, certain preferences are delineated in the general description of emulsion preparation which follows.

A preliminary emulsion is made by homogenizing oil and aqueous phases. The oil phase of the emulsion, which generally comprises from about 5 to 35 percent by weight of the total emulsion, is comprised of one or more inert hydrophobic liquids. Preferably, the oil phase comprises about 20 to 30 percent of the emulsion. The oil used may be selected from a large class of organic liquids which are immiscible with water, including liquid hydrocarbons and substituted liquid hydrocarbons. Representative examples of such oils include benzene, xylene, toluene, mineral oils, kerosenes, napthas, chlorinated hydrocarbons, such as perchloroethylene, and the like.

The oil phase also contains the primary surfactants, i.e. conventional emulsion polymerization stabilizers. Such stabilizers are well known to the art to promote the formation and stabilization of water-in-oil emulsions. Normally such emulsifiers have HLB values in the range of about 2 to about 10, preferably less than about 7. Suitable such emulsifiers include the sorbitan esters, phthalic esters, fatty acid glycerides, glycerine esters, as well as the ethoxylated versions of the above and any other well known relatively low HLB emulsifier. Examples of such compounds include sorbitan monooleate, the reaction product of oleic acid with isopropanolamide, hexadecyl sodium phthalate, decyl sodium phthalate, sorbitan stearate, ricinoleic acid, hydrogenated ricinoleic acid, glyceride monoester of lauric acid, glyceride monoester of stearic acid, glycerol diester of oleic acid, glycerol triester of 12-hydroxystearic acid, glycerol triester of ricinoleic acid, and the ethoxylated versions thereof containing 1 to 10 moles of ethylene oxide per mole of the basic emulsifier. Thus any emulsifier may be utilized which will permit the formation of the initial emulsion and stabilize the emulsion during the polymerization reaction, but will not provide sufficient freeze-thaw stability to the final emulsion such that the emulsion will pass at least three cycles of freeze-thaw stability tests as described in Example I below.

These primary surfactants are used alone or in mixtures and are utilized in as low amounts as is possible since an excess will not only increase the cost of the resultant emulsion but also reduce the performance. As such, all of the primary surfactants should together be used in amounts not greater than 3% by weight of the total emulsion. Preferably the amount is not greater than about 2%.

The aqueous phase generally comprises about 95 to 65 percent by weight of the emulsion. Preferably, it comprises about 80 to 70 percent thereof. In addition to water, the aqueous phase contains the monomers being polymerized, generally in an amount of less than about 40 percent, preferably about 20 to about 35 percent, and most preferably about 22 to 30 percent, by weight of the total emulsion, and generally chain transfer agents, initiators and sequestrants. Alternatively, the chain transfer agents, initiators and sequestrants may be added to the system after the preliminary emulsion has been prepared. The initiator may also be added continuously during the polymerization to control the rate of polymerization depending upon the particular monomers used and their reactivities. Further alternatively, the initiator may be present in either the oil or the aqueous phase with the monomers being added either continuously or incrementally thereafter. All of these variations are well known in the art.

Any monomers which, when polymerized or copolymerized, yield water-soluble polymers may be used in the present invention. The term "water-soluble" means that the polymer is soluble in water in an amount of at least 1% by weight. The polymer may be nonionic, anionic with less than about 35, preferably less than 25, mole percent anionicity, or cationic with less than about 15, preferably less than 10, mole percent cationicity. When the anionicity or cationicity are above these amounts, the resultant emulsions are generally inherently freeze-thaw stable and there is little need to add the ethoxylated alkylphenol surfactant to obtain the stability. Examples of monomers useful herein include acrylamide, acrylic acid and its salts, methacrylamide, methacrylic acid and its salts, maleic acid and its salts, methyl acrylate, ethyl acrylate, propyl acrylate, methyl methacrylate, ethyl methacrylate, dimethylaminoethyl methacrylate and its methylchloride and methosulfate quaternaries, dimethylaminoethyl acrylate and its methylchloride and methosulfate quaternaries, diethylaminoethyl acrylate and its methylchloride and methosulfate quaternaries, diethylaminoethyl methacrylate and its methylchloride and methosulfate quaternaries, hydroxyethyl acrylate, hydroxyethyl methacrylate, styrene, acrylonitrile, 2-acrylamido-2-methylpropane sulfonic acid and its salts, 3-(methylacrylamide)-proplytrimethylammonium chloride, vinyl methyl ether, vinyl ethyl ether, alkali metal and ammonium chloride, styrene sulfonic acid and its salts, and the like. Preferably, the monomers are selected from acrylamide, acrylic acid and its salts, a quaternary of dimethylaminoethyl methacrylate, and 3-(methacrylamido)-propyltrimethylammonium chloride. Most preferably the polymer is polyacrylamide, a copolymer of acrylamide and acrylic acid or its salts, or a copolymer of acrylamide and a quaternary of dimethylaminoethyl methacrylate.

Any conventional chain transfer agent may be employed, such as propylene glycol, isopropanol, 2-mercaptoethanol, sodium hydrophosphite, dodecyl mercaptan and thioglycolic acid. The chain transfer agent is generally present in an amount of about 0.1 to 10 percent by weight of the total emulsion, though more may be used.

The initiator may be any free radical producing material well known in the art. The preferred free radical initiators are the redox-type and the azo-type polymerization initiators and they are generally used in an amount of about 0.0005 to 0.5 percent by weight of the total emulsion. Radiation may also be used to initiate the reaction.

Any conventional sequestrant may also be present in the aqueous phase, such as ethylenediaminetetraacetic acid or pentasodium diethylenentriamine pentaacetate. The sequestrant is generally present in an amount of about 0.01 to 2 percent by weight of the total emulsion, though more may be utilized.

Following preparation of the preliminary emulsion, polymerization of the monomers is commenced at a temperature sufficiently high to break down the initiator to produce the desired free radicals. Generally a suitable temperature is about $-20°$ C. to $200°$ C. with a preferred temperature of about $20°$ C. to $100°$ C.

Preferably the polymerization is run at a pH of about 2 to 12 and a suitable amount of base or acid may be added to the preliminary emulsion to achieve the desired pH. The polymerization is usually completed in about an hour or two to several days, depending upon the monomers employed and other reaction variables. It is generally carried out at atmospheric pressure, but higher pressures are advantageously used when volatile ingredients are involved.

Following completion of the polymerization, the pH of the emulsion may be adjusted as desired. For an anionic polymer emulsion, this is generally about 4 to 10; for cationic emulsions about 2.0 to 5.5; and for non-ionic emulsions about 2.0 to 7.0. A breaker surfactant is generally added to yield a single package of final product. Any suitable breaker surfactant may be employed, experimentation being the best means of determining which breaker surfactant will perform optimally with a given emulsion system. Typical breaker surfactants include those having relatively high HLB numbers such as highly ethoxylated nonyl phenols, ethoxylated nonyl phenol formaldehyde resin, polyethylene oxide esters, dioctyl esters of sodium sulfosuccinate and other disclosed in U.S. Pat. No. 3,624,019 incorporated herein by reference. Typically, the breaker surfactant is added in an amount equal to about 0.5 to 5 percent by weight, based on the total emulsion. Preferably the amount is less than 3 percent and most preferably less than about 2.5 percent. It is an additional benefit of the present invention that the amount of the breaker surfactant required may be reduced below that amount which would otherwise be required.

Once prepared, the emulsions of the present invention may be chemically modified in any known manner. "Chemically modified" is intended to cover further treatment of the dispersed water-soluble polymer and/or the addition of components to the dispersed water-soluble polymer which, without the stabilization provided by the emulsion stabilizers, would cause the normally water-soluble polymeric particles to coagulate or agglomerate. Examples of such further treatments are disclosed in U.S. Pat. Nos. 4,052,353 and 4,171,296, incorporated herein by reference. The emulsion of the present invention may also be concentrated in any suitable manner, such as is disclosed in U.S. Pat. No. 4,021,399, incorporated herein by reference.

The following examples are illustrative of the present invention, but are not in any way a limitation thereof. All parts and percents are by weight unless otherwise specified.

EXAMPLE I

A water phase containing 260 g. of acrylamide, 1.2 g. of ethylenediaminetetraacetic acid, 0.5 g. of potassium bromate, and 431.6 g. of water is homogenized with an oil phase containing 240 g. of oil, 12.5 g. of hydrogenated ricinoleic acid which has been ethoxylated with five moles of ethylene oxide and 4.1 g. of sorbitan monooleate. The resulting emulsion system is than transferred to a suitable reaction vessel with stirring and sparged with nitrogen 23.5 g. of a 4.5% solution of sodium bisulfate is added continuously during the polymerization and the temperature of the emulsion increases to about 35–45° C. Cooling is provided to maintain this temperature and agitation is maintained for 4-10 hours. The polymerization is completed at the end of that time and results in a non-ionic polyacrylamide emulsion having 26 percent polymer solids.

The emulsion is split into two portions of 486.7 g. each. To one portion (A) is added 12.0 g. of mixture of polyethylene glycol sesquioleate, polyethylene glyol dioleate and ethoxylated nonyl phenol having 10 moles of ethoxylation (the "breaker system") to yield a one package product. To the other portion (B) is added the same 12.0 g. of the breaker system along with 1.0 g. of an ethoxylated alkylphenol surfactant, i.e. Igepal CA-210, an octylphenol-ethylene oxide adduct containing about 1.2-1.5 moles of ethylen oxide.

The two finished emulsions are then evaluated for mechanical stability and freeze-thaw stability as follows:

1—Mechanical Stability

Mechanical stability of each water-in-oil emulsions is determined by placing 50 grams of a final emulsion on a magnetic stirrer in a glass jar containing the emulsion and a heavy magnetic stirring bar. The unit is allowed to stir at a fixed speed of 1,000 to 1,500 rpm until gel particles form or the contents of the jar solidifies. The test in conducted from a minimum time period of 100 hours, typically for 1000 hours. Products passing the 100 hours are usually field acceptable; products passing the 1000 hours are acceptable under all field conditions.

2—FREEZE-THAW STABILITY

The laboratory test for freeze-thaw stability is as follows: approximately 200 grams of the final emulsion product is frozen down with stirring in a cryogenic unit to −20° C. The product is then allowed to thaw to room temperature and its properties, e.g., viscosity, gel count are measured. The cycle is repeated until the product gels or for a maximum of 3 to 5 cycles.

Emulsion A, which represents the prior art, passed the mechanical stability test with 1,000 hours but failed the freeze-thaw test by being completely gelled after the first cycle.

Emulsion B, which represents the present invention, passed the mechanical stability test with 1,000 hours and in addition showed no change in viscosity and no gel formation after three freeze-thaw cycles.

EXAMPLE II

The basic procedure of Example I was repeated except that the ethoxylated alkylphenol surfactant was replaced by Igepol CO-210, a nonylphenol-ethylene oxide adduct containing 1.5 moles of ethylene oxide. The resultant emulsion passed both the mechanical stability and freeze-thaw tests as had Emulsion B of Example I.

EXAMPLE III

To compare the freeze-thaw stabilizing effect of a variety of alkylphenols having different levels of ethoxylation on a cationic copolymer emulsion, a copolymer emulsion of 64% dimethylaminoethylmethacrylate methyl chloride quaternary and 36% acrylamide was prepared. To separate 200g portions of the emulsion were added 3.3% of the breaker system of Example I and 0.2% of the alkylphenol with stirring to a medium vortex for 15 minutes. The samples were aged at room temperature for 24 hours and then placed in a freezer at −30° C. for 15 hours. After the samples were completely frozen, they were allowed to quilibriate to room temperature at which point the sample should be completely thawed. The samples were slowly poured into a cup to determine the total number of observed gels. After the evaluation the samples were returned to the freezer for two additional cycles.

The alkylphenols evaluated and the results are given in Table I. The results indicate the number of large, medium, and small gels in order for each cycle unless the sample was completely gelled. The superiority of the low ethoxylated alkylphenols is evident from the results.

TABLE I

| Alkylphenol | | Results of Example III Gels Observed per Cycle | | |
|---|---|---|---|---|
| R | n | 1 | 2 | 3 |
| 8 | 1.5 | 0,0,3 | 0,1,4 | 1,1,4 |
| 8 | 3 | 0,2,2 | 8,4,3 | gelled |
| 9 | 4 | gelled | — | — |
| 8 | 3 | 0,5,3 | gelled | — |
| 8 | 5 | 1,4,6 | gelled | — |

EXAMPLE IV

The procedure of Example III was repeated for an anionic polymer prepared from 30% acrylic acid and 70% acrylamide. The results are given in Table II and the superiority of lowly ethoxylated alkylphenols is evident.

TABLE II

| Alkylphenol | | Results of Example IV Gels Observed per Cycle | | |
|---|---|---|---|---|
| R | n | 1 | 2 | 3 |
| 8 | 1.5 | 0,0,4 | 0,4,5 | 1,7,10 |
| 8 | 3 | 2,4,7 | 5,8,10 | 7,10,12 |
| 9 | 4 | 3,3,6 | 4,5,10 | 8,10,12 |
| 8 | 3 | 3,5,6 | 4,6,10 | 10,12,13 |
| 8 | 5 | 1,4,6 | 4,5,7 | 7,10,9 |

EXAMPLE V

The procedure of Example IV was repeated for anionic polymer prepared from 5% acrylic acid and 95% acrylamide. The results are given in Table III and the superiority of lowly ethoxylated alkylphenol is evident though not as great as for more highly anionic polymers.

TABLE III

| Alkylphenol | | Results of Example V Gels Observed per Cycle | | |
|---|---|---|---|---|
| R | n | 1 | 2 | 3 |
| 8 | 1.5 | 1,3,4 | 5,4,5 | 7,6,8 |
| 8 | 3 | 2,0,0 | 6,3,2 | 8,10,12 |
| 9 | 4 | 4,5,6 | 5,6,8 | gelled |
| 8 | 3 | 5,5,8 | 5,7,9 | 10,13,15 |
| 8 | 5 | 10,10,15 | gelled | — |

EXAMPLE VI

The procedure of Example IV was repeated except that the breaker surfactant was replaced with 2% nonylphenol containing 10 moles of ethoxylation. The results are given in Table IV and the superiority of the lowly ethoxylated alkylphenol is evident.

TABLE IV

| Alkylphenol | | Results of Example VI Gels Observed per Cycle | | |
|---|---|---|---|---|
| R | n | 1 | 2 | 3 |
| 8 | 1.5 | 0,0,4 | 0,4,5 | 1,7,10 |
| 8 | 3 | 0,3,12 | 2,6,5 | 4,15,20 |
| 9 | 4 | 1,5,0 | 4,9,10 | 7,12,22 |
| 8 | 3 | 0,2,5 | 3,10,12 | 5,12,15 |
| 8 | 5 | 3,6,0 | 6,15,10 | 7,18,22 |

What is claimed is:

1. A freeze-thaw stabilized water-in-oil emulsion of a water-soluble acrylamide polymer having less than about 40 percent by weight of the water-soluble polymer, an inverting breaker surfactant, and a freeze-thaw stabilizing amount of an ethoxylated alkylphenol surfactant of the formula:

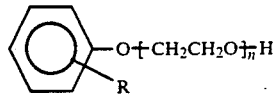

wherein R is a straight chain or branched alkyl group having 8-9 carbon atoms and n is an integer having an average value of more than 1 and up to about 2.

2. The emulsion of claim 1 wherein the water-soluble acrylamide polymer is a copolymer further comprised of a monomer selected from acrylic acid and its salts, methacrylic acid and its salts, maleic acid and its salts, methyl acrylate, ethyl acrylate, propyl acrylate, methyl matacrylate, ethyl methacrylate, dimethylaminoethyl acrylate and its methyl chloride and methosulfate quaternaries, dimethylaminoethyl matacrylate its methylchloride and methosulfate quaternaries, diethylainoethyl acrylate and its methylchloride and methosulfate quaternaries, diethylaminoethyl methacrylate and its methylchloride and methosulfate quaternaries, hydroxyethyl acrylate, hydroxyethyl methacrylate, styrene, acrylonitrile, 2-acrylamido-2-methylpropane sulfonic acid and its salts, 3-(methacrylamido)-propyl-trimethylammonium chloride, vinyl methyl ether, vinyl pyridine, vinyl pyrrolidone, vinyl imidazole, diallyldimthylammonium chloride, styrene sulfonic acid and its salts, or mixtures thereof.

3. The emulsion of claim 1 wherein n has an average value of about 1.2 to about 1.8.

4. The emulsion of claim 1 wherein the ethoxylated alkylphenol surfactant is employed in an amount less than about 0.5 percent by weight, based on the total emulsion.

5. The emulsion of claim 1 wherein the ethoxylated alkylphenol surfactant is added to the emulsion after completion of the polymerization.

6. The emulsion of claim 5 wherein the ethoxylated alkylphenol surfactant is blended with inverting breaker surfactant prior to its addition to the emulsion.

7. The emulsion of claim 1 wherein the emulsion contains one or more primary surfactants in a total amount of less than about 3.0 percent by weight, based on the weight of the total emulsion.

8. The emulsion of claim 1 wherein the primary surfactant is a mixture of a glyceride and a sorbitan ester.

9. The emulsion of claim 8 wherein the glyceride is ethoxylated with 1 to 10 moles of ethylene oxide per mole of glyceride.

10. The emulsion of claim 1 wherein the water-soluble polymer is anionic with less than about 25 mole percent anionicity.

11. The emulsion of claim 1 wherein the water-soluble polymer is cationic with less than about 10 mole percent cationicity.

12. The emulsion of claim 1 wherein the water-soluble polymer is selected from the group consisting of polyacrylamide, a copolymer of acrylamide and less than about 25 mole percent acrylic acid or its salts, and a copolymer of acrylamide and less than about 10 mole percent of a quaternary of dimethylaminoethyl methacrylate.

13. A method of freeze-thaw stabilizing a water-in-oil emulsion of a water-soluble acrylamide polymer having less than about 40 percent by weight polymeric solids and an inverting breaker surfactant comprising adding thereto a freeze-thaw stabilizing amount of an ethoxylated alkylphenol surfactant of the formula:

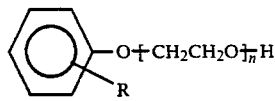

wherein R is a straight chain or branched alkyl group having 8-9 carbon atoms and n is an integer having an average value of more than 1 and up to about 2.

14. The method of claim 13 wherein the water-soluble acrylamide polymer is a copolymer further comprised of a monomer selected from acrylic acid and its salts, methacrylic acid and its salts, maleic acid and its salts, methyl acrylate, ethyl acrylate, propyl acrylate, methyl mathacrylate, ethyl methacrylate, dimethylaminoethyl acrylate and its methylchloride and methosulfate quaternaries, dimethylaminoethyl methacrylate and its methylchloride and methosulfate quaternaries, diethylaminoethyl acrylate and its methylchloride and methosulfate quaternaries, diethylaminoethyl methacrylate and its methylchloride and methosulfate quaternaries, hydroxyethyl acrylate, hydroxyethyl methacrylate, styrene, acrylonitrile, 2-acrylamido-2-methylpropane sulfonic acid and its salts, 3-(methacrylamido)-propyltrimethylammonium chloride, vinyl methyl ether, vinyl pyridine, vinyl pyrrolidone, vinyl imidazole, diallyldimethylammonium chloride, styrene sulfonic acid and its salts, or mixtures thereof.

15. The method of claim 13 wherein the water-soluble polymer is present in an amount of about 20 to 35 percent by weight, based on the total emulsion.

16. The method of claim 13 wherein the ethoxylated alkylphenol surfactant is employed in an amount less than about 0.5 percent by weight, based on the total emulsion.

17. The method of claim 13 wherein the ethoxylated alkylphenol surfactant is added to the emulsion after completion of the polymerization.

18. The method of claim 17 wherein the ethoxylated alkylphenol surfactant is blended with an inverting breaker surfactant prior to its addition to the emulsion.

19. The method of claim 13 wherein the emulsion contains one or more primary surfactants in an amount of less than about 3.0 percent by weight, based on the weight of the total emulsion.

20. The method of claim 13 wherein the primary surfactant is a mixture of a glyceride and a sorbitan ester.

21. The method of claim 20 wherein the glyceride is ethoxylated with 1 to 10 moles of ethylene oxide per mole of glyceride.

22. The method of claim 13 wherein n has an average value of about 1.2 to about 1.8.

23. The method of claim 13 wherein the water-soluble polymer is selected from the group consisting of polyacrylamide, a copolymer of acrylamide and less than about 25 mole percent acrylic acid or its salts, and a copolymer of acrylamide and less than about 10 mole percent of a quaternary of dimethylaminoethyl methacrylate.

* * * * *